(12) United States Patent
Seel

(10) Patent No.: US 9,755,729 B2
(45) Date of Patent: Sep. 5, 2017

(54) SATELLITE COMMUNICATION LINK

(71) Applicant: Tesat-Spacecom GmbH & Co. KG, Backnang (DE)

(72) Inventor: Stefan Seel, Murrhardt (DE)

(73) Assignee: Tesat-Spacecom GmbH & Co. KG, Basknang (DE)

( * ) Notice: Subject to any disclaimer, the term of this patent is extended or adjusted under 35 U.S.C. 154(b) by 0 days.

(21) Appl. No.: 14/998,153

(22) Filed: Dec. 23, 2015

(65) Prior Publication Data

US 2016/0182143 A1 Jun. 23, 2016

(30) Foreign Application Priority Data

Dec. 23, 2014 (DE) .................... 10 2014 019 271

(51) Int. Cl.
*H04B 7/185* (2006.01)

(52) U.S. Cl.
CPC ..... *H04B 7/18513* (2013.01); *H04B 7/18532* (2013.01)

(58) Field of Classification Search
CPC ............. H04B 7/18513; H04B 7/18532
See application file for complete search history.

(56) References Cited

U.S. PATENT DOCUMENTS

| 2003/0081582 | A1* | 5/2003 | Jain ..................... H04B 7/18582 370/338 |
| 2005/0046616 | A1* | 3/2005 | Sai ........................ H04W 16/28 342/360 |
| 2013/0064551 | A1 | 3/2013 | Heine et al. |
| 2013/0136142 | A1 | 5/2013 | Kolze |
| 2013/0156439 | A1 | 6/2013 | Arnold et al. |

FOREIGN PATENT DOCUMENTS

DE    10 2011 113 148 A    3/2013

* cited by examiner

*Primary Examiner* — Chuong A Ngo
(74) *Attorney, Agent, or Firm* — Crowell & Moring LLP

(57) ABSTRACT

A device configure to wirelessly transmitting optical signals via a satellite communication link includes a first sending arrangement and a first receiving arrangement. The first sending arrangement is configured to transmit optical signals via a first transmission path and a second transmission path to the first receiving arrangement. The first transmission path has a first transmission channel and the second transmission path has a second transmission channel. In addition, the first transmission channel is physically separated from the second transmission channel, while the second transmission channel is a low-rate transmission channel for transmitting amplitude-modulated optical signals.

14 Claims, 1 Drawing Sheet

SATELLITE COMMUNICATION LINK

CROSS REFERENCE TO RELATED APPLICATIONS

This application claims priority under 35 U.S.C. §119 from German Patent Application No. 10 2014 019 271.7, filed Dec. 23, 2014, the entire disclosure of which is herein expressly incorporated by reference.

FIELD OF THE INVENTION

The invention relates to a device for wirelessly transmitting optical signals via a satellite communication link and a satellite communication link between two terminals, of which at least one is a satellite, having such a device, for example between the Earth's surface and a first satellite or between an aircraft or another satellite to the first satellite.

BACKGROUND OF THE INVENTION

Satellites which are designed for a data connection for receiving and/or sending data to and from a remote station are commonly referred to as communication satellites. Communication satellites may be used to receive information signals such as television signals, voice signals or other information data on the one hand, and to transmit this data on the other hand in the direction of another region of the Earth's surface.

Due to the resulting high data volume, high-rate transmission protocols, that is, protocols with a high data rate in the range of several gigabits per second (Gbps), are typically used. Such transmission protocols typically require special receiving and sending assemblies, which are adapted to the respective transmission protocol used, for example, to keep the error rate as low as possible, so that the available bandwidth is used effectively. The sending and receiving arrangements adapted to the transmission protocols may be of high technical complexity, such that these are typically provided for no more than one transmission protocol. The transmission protocol applies in particular to the manner of the physical transmission of signals, for which the sending and receiving arrangements have adapted sending and receiving units. For example, it may be necessary for the receiving of electromagnetic waves in different wavelength ranges to provide different receiving and sending units. Especially in the field of communication satellites, the quantity and diversity of the installed devices is an essential aspect, so that the sending and receiving apparatuses are typically not provided for a plurality of different transmission protocols.

In the field of communication satellites, a plurality of different communication protocols are used throughout the world, which causes, in particular, that a remote station located on the Earth's surface (stationary) or in an aircraft (mobile) cannot exchange data via a high-rate connection with any desired communication satellite.

Under certain circumstances, the need may arise that a mobile or stationary remote station must exchange data with a communication satellite, for example if an aircraft in the Earth's atmosphere or a receiver on the Earth's surface is to receive data from a communication satellite, or if data from the Earth's surface is to be sent to a communication satellite with an unknown high-rate transmission protocol. If, however, the communication satellite is only configured for a single high-rage transmission protocol, it may then be necessary that the remote station uses a sending and receiving arrangement which is adapted to this high-rate transmission protocol.

SUMMARY OF THE INVENTION

It may be regarded as an object of the invention to simplify the exchange of data with communication satellites which use different high-rate transmission protocols. In particular, it may be regarded as the object of the invention to enable an exchange of data between terminals with different high-rate transmission protocols, without complex adjustments to the sending and receiving arrangements of the high-rate transmission protocols.

According to a first aspect of the invention, a device for wireless transmission of optical signals via a satellite communication link is provided. The device has a first sending arrangement and a first receiving arrangement. The first sending arrangement is designed to transmit optical signals via a first transmission path and a second transmission path to the first receiving arrangement. The first transmission path has a first transmission channel and the second transmission path has a second transmission channel, wherein the first transmission channel is physically separated from the second transmission channel and wherein the second transmission channel is a low-rate transmission channel for transmitting amplitude-modulated optical signals.

In other words, such a device provides two physically separated transmission channels, wherein a high-rate signal is transmitted via the first transmission channel and in addition, a low-rate signal is transmitted via the second transmission channel. Both the high-rate signal and the low-rate signal may be transmitted by means of a laser, meaning that a laser emitter in the sending arrangement emits a corresponding laser signal, which can be detected in the receiving arrangement by a corresponding receiving unit. A laser signal is to be understood as a coherent optical signal. The wavelength of the laser signal may differ depending on the field of application.

A physical separation of the transmission channels is to be understood, for example, as the use of different carrier signals and/or the use of different sending/receiving units on the one hand for the high-rate transmission channel and on the other hand for the low-rate transmission channel. This may enable in particular that the sending arrangement and the receiving arrangement of the high-rate transmission channel need not be adapted in order to send or receive a second transmission protocol, as in addition to the high-rate transmission channel, a second, independent low-rate transmission channel is provided.

In particular, amplitude-modulated optical signals are transmitted via the low-rate transmission channel. Amplitude-modulated optical signals are signals whose intensity is changed with time. A low-rate transmission channel which uses such a transmission protocol can be provided with little technical effort. In particular, a corresponding sender and/or receiver is not technically complex and is characterized by a low weight. Thus, for example, the sender can be arranged onboard a satellite, or existing laser diodes, which exist alongside the high-rate transmission channel, may be used for the transmission of data via the low-rate transmission channel. Here, only the amplitude, that is, the intensity, of the existing laser diodes need be changed over time in order to form the second, low-rate transmission channel by amplitude modulation. When data is sent from a satellite in the direction of the Earth's surface via amplitude modulation, a simple receiver, for example in the form of a camera adapted for the receiving of laser signals, is thus sufficient to receive data via the low-rate transmission channel. The receiving device may be integrated into a mobile device, for example, in the simplest case into a smartphone or similar portable computing device with an optical receiving arrangement.

The device may transmit data unidirectionally or bidirectionally, that is, from a satellite towards the Earth's surface or vice versa, or in both directions. The sending arrangement may be arranged in a base station on the Earth's surface or in a satellite in orbit, for example on a geostationary satellite, and the receiving arrangement may be arranged on the satellite or on the Earth's surface.

Especially in the case of bidirectional transmission

The advantage resulting from this device is that the information data can be transmitted between two terminals via a transmission channel which is not technically complex and which can be provided with little effort, specifically via the second, amplitude-modulated transmission channel, although these two terminals cannot exchange data via a high-rate transmission channel due to differing transmission protocols. For the purposes of this description, a transmission protocol can be understood in particular as the requirement for the electrical or optical configuration of the terminal units involved in the transmission. Under this concept the manner of processing (for example coding and wave length) of the optical signal for the transmission through the transmission medium may also be understood.

The device described here is particularly suitable for use with existing communication satellites, which use various high-rate transfer protocols. In particular, it is not necessary, for example, that the existing sending and receiving arrangements of the high-rate transmission protocol be replaced. Thus, there arises no need for a costly retrofitting of existing communication satellites.

Via the second transmission channel, for example, status information regarding the state of a connection or receiver confirmations, as well as information regarding the reception power, can be transmitted. This may be particularly helpful if a terminal of the satellite communication link is designed on the high-rate transmission channel only as a receiver, i.e. is configured for a unidirectional communication, and no return channel is available. In such a case, information which useful for controlling the transmission on the high-rate transmission channel can be transmitted via the low-rate transmission channel.

In other words, the device has a second transmission channel with a slow amplitude modulation as a supplement to a high-rate transmission channel, which may be designed, for example, as a phase modulation data channel. Such a slow laser amplitude modulation may be received and decoded with comparatively simple means, even by receivers with wavelengths and modulation methods, for example by receivers from different manufacturers.

According to one embodiment of the invention, the device has a second sending arrangement and a second receiving arrangement, wherein the second sending arrangement is spatially associated with the first receiving arrangement and wherein the second receiving arrangement is spatially associated with the first sending arrangement.

An outward and return channel can thus be provided, i.e. data can be transmitted in two directions via a satellite communication link. In particular, information data can be transmitted in two directions between two terminals via the second amplitude-modulated transmission channel.

According to a further embodiment of the invention, the second sending arrangement is designed to transmit optical signals to the second receiving arrangement via the first transmission path and the second transmission path.

Both the first transmission path and the second transmission path can be used as bidirectional transmission paths.

According to a further embodiment of the invention, the second transmission path is a high-rate transmission path.

The low-rate transmission path transmits signals at a signal rate of a few hundred Hertz (Hz) to a few kHz, for example up to 10 kHz. The high-rate transmission path transmits signals at a signal rate or data rate of several Gbps. The second transmission path is an additional transmission path, which is provided in addition to and physically separate from the high-rate transmission path. Thus, information can be transmitted between two terminals with a technically simple sending/receiving method and a sending/receiving arrangement of low complication. Terminals can exchange data with one another via the second transmission path, which cannot build a data connection via the high-rate transmission path due to the use of differing transmission methods or transmission protocols. Thus, the low-rate transmission path may be used, for example, as a general control channel between terminals which are not compatible with one another via the high-rate transmission path.

According to a further aspect of the invention, a satellite communication link is specified. The satellite communication link has a device as described herein, wherein the first sending arrangement is arranged onboard a satellite in orbit.

The optical signals are preferably laser signals or are generated by a laser, so that these can also be transmitted to the Earth's surface from great distances, for example from the geostationary orbital path, in a comparatively strongly bundled manner. Through the use of amplitude modulation, simple receiving arrangements may receive and detect the signals sent from the satellite.

Laser signals have the advantage that they themselves arrive at the Earth's surface in a relatively strongly bundled manner when sent from a geostationary orbital path, so that corresponding signals can be detected on a surface with a diameter of approximately 0.5 km. However, this strong bundling can also cause that the sending arrangement must be aligned with the receiving arrangement, so that the laser signal makes spatial contact with the receiving arrangement. Control information for aligning the sending arrangement can be transmitted via the second, low-rate transmission channel.

According to a further embodiment of the invention, the first receiving arrangement is arranged on the Earth's surface.

The first receiving arrangement may be, for example, a mobile device, which is designed to receive laser signals and to determine the amplitude, i.e. the intensity, thereof, so that the transmitted information can be demodulated from the laser signal. In one example, the receiving arrangement may be a camera, which determines the laser intensity and supplies a demodulator, wherein the demodulator determines a signal pattern, such as a bit string, and this signal pattern supplies a decoding unit, which determines the information data from the bit string.

Alternatively, the first receiving arrangement may be arranged in a base station which is in a fixed location with respect to the Earth's surface.

According to a further embodiment of the invention, the satellite communication link comprises a plurality of receiving arrangements, which are arranged on the Earth's surface and are designed to receive data from the first sending arrangement via the second transmission path.

Thus, the first sending arrangement may distribute information data to a plurality of receivers on the Earth's surface via a low-rate amplitude-modulated signal. For instance, information can be transmitted by means of the satellite to remote areas of the Earth, wherein the information can be received and decoded with simple receiving arrangements, as amplitude modulation is used as the modulation method.

According to a further embodiment of the invention, the satellite communication link further has a second sending arrangement and a second receiving arrangement, wherein the second sending arrangement is arranged on the Earth's surface and wherein the second receiving arrangement is arranged on the satellite.

This embodiment enables data transmission between the Earth's surface and the satellite via a low-rate transmission channel in addition to the existing high-rate transmission channel. Bidirectional data exchange is possible both via the low-rate transmission channel and via the high-rate transmission channel.

According to a further embodiment, a satellite communication link is provided wherein the first receiving arrangement is arranged onboard an aircraft.

This enables the transmission of data to an aircraft via the low-rate transmission channel, in particular during flight of the aircraft. In other words, this means that data can be transmitted between a satellite and a low-flying aircraft. The low-flying aircraft may in particular be located in the Earth's atmosphere, i.e. at an altitude of up to several tens of kilometers. In principle, the data transfer here may take place in a similar manner as between a terminal on the Earth's surface and the satellite, so that the above explanations for these embodiments apply equally, mutatis mutandis.

According to a further embodiment of the invention, the satellite communication link further has a second sending arrangement and a second receiving arrangement, wherein the second sending arrangement is arranged onboard the aircraft and wherein the second receiving arrangement is arranged on the satellite.

This embodiment allows a data transmission between the aircraft and a satellite via a low-rate transmission channel in addition to an existing high-rate transmission channel.

According to a further embodiment of the invention, the first receiving arrangement is arranged onboard a second satellite.

This embodiment enables a transmission between two satellites via the low-rate transmission channel, which satellites use different transmission protocols on the high-rate transmission channel or which cannot exchange data with one another via the high-rate transmission channel for other reasons.

The invention may be described in other words as follows:

A satellite communication link has sending and receiving arrangements which are equipped with units which can read laser signals at least with a frequency of several hundred Hertz to a few kHz. These laser signals are transmitted via a physically separate transmission channel in addition to a high-rate transmission channel by means of amplitude modulation. Laser signals are thus transmitted via a simple, robust and low-sensitivity interface. This enables a transfer of data between terminals which cannot exchange data via the high-rate transmission channel. This results, among others, in the advantage that data can be transmitted to a purely passive receiver (unidirectional). Unmanned aircraft may exchange information with a satellite via the low-rate transmission channel; for instance, route information from the satellite can thus be transmitted to the unmanned aircraft.

In the following, exemplary embodiments of the invention will be described with reference to the figures.

DETAILED DESCRIPTION OF THE EXEMPLARY EMBODIMENTS

Figure 1:
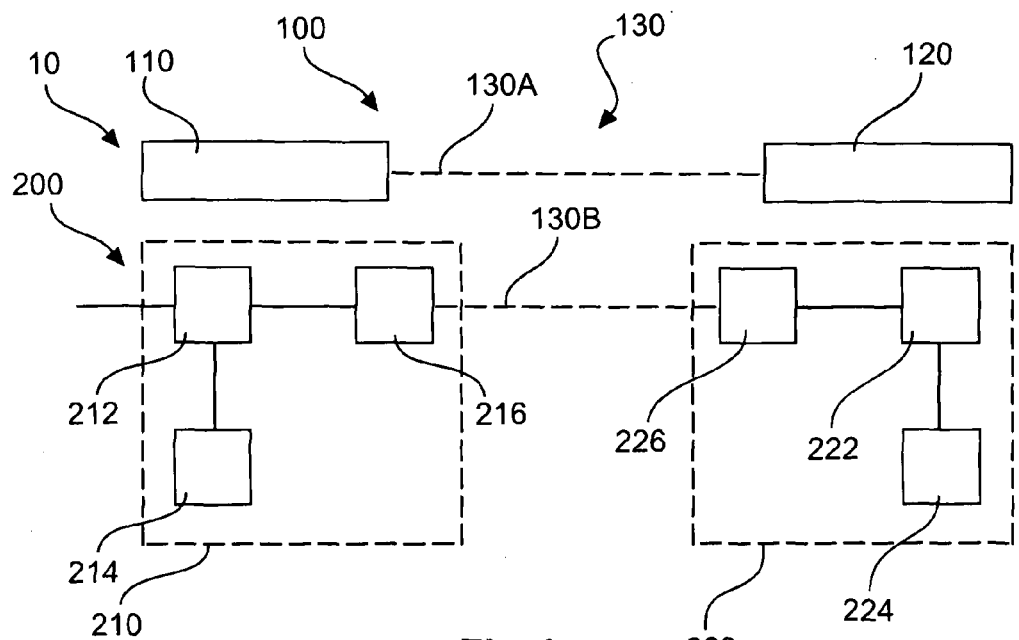
FIG. 1 shows a schematic representation of a device for transmitting signals according to one embodiment of the invention.

The representations in the figures are schematic and not to scale. Where identical reference characters are used, they refer to identical or similar elements.

FIG. 1 shows a device 10 for wireless transmission of optical signals. The device 10 has a first transmission path 100 with a high-rate transmission channel 130A. Further, the device 10 has a second transmission path 200 with a low-rate transmission channel 130B.

Each transmission path 100, 200 is associated with a sending arrangement 110, 210 and a receiving arrangement 120, 220. The sending arrangements 110, 210 for the low-rate transmission path and the high-rate transmission path may be accommodated in a common housing. The same applies to the two associated receiving arrangements 120, 220.

FIG. 1 shows a unidirectional configuration, as the sending arrangement 110, 210 is located at one terminal and the receiving arrangement 120, 220 is located at another terminal. It should be noted that each terminal may have both a sending arrangement and a receiving arrangement, in order to enable a bidirectional exchange of data. Here, a principally identical configuration of the sending arrangement and receiving arrangement can be provided for each communication direction (first terminal to second terminal and vice versa). This means that in each of these two directions, data can be transmitted via a high-rate transmission path and, at the same time, via a low-rate transmission path which is physically separate therefrom.

The sending arrangement 110 is designed to send laser signals to the receiving arrangement 120 with a data rate of several Gbps. The sending arrangement 120 has a modulation unit 212, a generator unit 214 and a sending unit 216. The generator unit 214 is designed to provide data, which the modulation unit 212 modulates to a signal by means of amplitude modulation. The correspondingly modulated signal is sent in the direction of the receiving arrangement 220 via the sending unit 212, for example a laser diode. On the side of the receiving arrangement 220, the laser signal is received by the receiving unit 226 and the modulated signal is determined by means of the demodulator unit 222. The demodulated signal is supplied to the signal readout unit 224, in order to supply the read-out signal for further processing.

Figure 2:
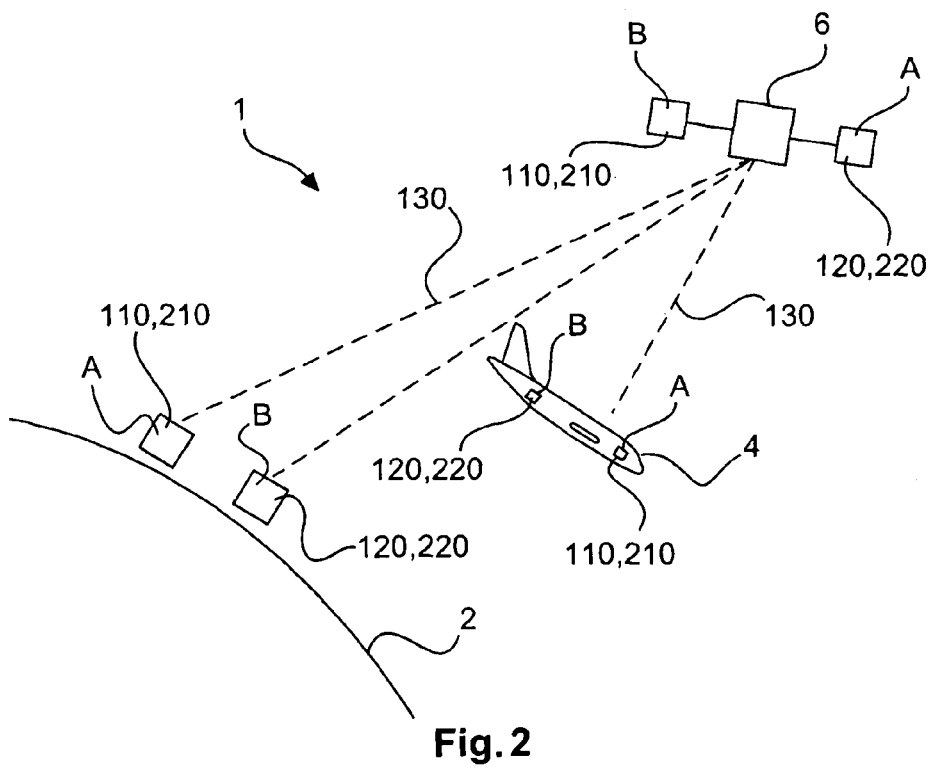
FIG. 2 shows a schematic representation of a satellite communication link according to a further embodiment of the invention.

FIG. 2 shows a satellite communications link 1. Various exemplary connections 130 are shown between a base station on the Earth's surface 2 and a satellite 6, as well as between an aircraft 4 and the satellite 6.

An uplink between the base station on the Earth's surface 2 and the satellite 6 is marked with the letter A on the Earth's surface (sending arrangement) and the satellite (receiving arrangement). As shown in FIG. 1, this uplink has two transmission paths, specifically a high-rate and a low-rate transmission path. This is true for each connection which is shown in FIG. 2. This configuration may be particularly advantageous, as the robustness and error rate of the high-rate transmission path can be increased through the transmission of confirmation packets or configuration packets by means of a parallel channel or a return channel via the low-rate transmission path.

An uplink can likewise be established between the sending arrangement 110, 210 onboard the aircraft 4 and the receiving arrangement 120, 220, and this is also marked with the letter A.

The satellite 6 has a sending arrangement 110, 210 in order to emit laser signals and radiate towards the Earth's surface 2 and aircraft 4. This connection may be referred to as a downlink, and the associated components are respectively marked with the letter B. The uplink corresponds to the downlink in basic structure.

LIST OF REFERENCE CHARACTERS 1 satellite communication link
2 Earth's surface
4 aircraft
6 satellite
10 device for transmission of signals
100 first high-rate transmission path
110 sending arrangement
120 receiving arrangement
130 communication link
130A first transmission channel
130B second transmission channel
200 second low-rate transmission path
210 sending arrangement
212 modulation unit
214 generator unit
216 sending unit
220 receiving arrangement
222 demodulator unit
224 signal readout unit
226 receiving unit

What is claimed is:

1. A device configured to wirelessly transmit optical signals via a satellite communication link, the device comprising:
   a first sending arrangement; and
   a first receiving arrangement;
   wherein the first sending arrangement is configured to transmit optical signals via a first transmission path and a second transmission path to the first receiving arrangement,
   wherein the first transmission path has a first transmission channel and the second transmission path has a second transmission channel,
   wherein the first transmission channel is physically separated from the second transmission channel,
   wherein the second transmission channel is a low-rate transmission channel for transmitting amplitude-modulated optical signals,
   wherein a bandwidth of the second transmission channel is lower than a bandwidth of the first transmission channel, and
   wherein the second transmission channel is a control channel between terminals which are not compatible with one another via the first transmission channel such that at least one of confirmation packets and configuration packets are transmitted via the second transmission channel.

2. The device according to claim 1, further comprising
   a second sending arrangement; and
   a second receiving arrangement;
   wherein the second sending arrangement is spatially associated with the first receiving arrangement, and
   wherein the second receiving arrangement is spatially associated with the first sending arrangement.

3. The device according to claim 2, wherein the second sending arrangement is configured to transmit optical signals via the first transmission path and a second transmission path to the second receiving arrangement.

4. The device according to claim 1, wherein the second sending arrangement is configured to transmit optical signals via the first transmission path and a second transmission path to the second receiving arrangement.

5. A satellite communication link, comprising:
   a device configured to wirelessly transmit optical signals via a satellite communication link, wherein the device includes a first sending arrangement and a first receiving arrangement,
   wherein the first sending arrangement is onboard a satellite in orbit and is configured to transmit optical signals via a first transmission path and a second transmission path to the first receiving arrangement,
   wherein the first transmission path has a first transmission channel and the second transmission path has a second transmission channel,
   wherein the first transmission channel is physically separated from the second transmission channel,
   wherein the second transmission channel is a low-rate transmission channel for transmitting amplitude-modulated optical signals,
   wherein a bandwidth of the second transmission channel is lower than a bandwidth of the first transmission channel, and
   wherein the second transmission channel is a control channel between terminals which are not compatible with one another via the first transmission channel such that at least one of confirmation packets and configuration packets are transmitted via the second transmission channel.

6. The satellite communication link according to claim 5, wherein the first receiving arrangement is arranged on the Earth's surface.

7. The satellite communication link according to claim 6, wherein the satellite communication link has a plurality of first receiving arrangements, which are arranged on the Earth's surface and which are designed to receive data from the first sending arrangement via the second transmission path.

8. The satellite communication link according to claim 6, further comprising:
   a second sending arrangement; and
   a second receiving arrangement;
   wherein the second sending arrangement is arranged on the Earth's surface, and
   wherein the second receiving arrangement is arranged on the satellite.

9. The satellite communication link according to claim 5, wherein the satellite communication link has a plurality of first receiving arrangements, which are arranged on the Earth's surface and which are designed to receive data from the first sending arrangement via the second transmission path.

10. The satellite communication link according to claim 9, further comprising:
  a second sending arrangement; and
  a second receiving arrangement;
  wherein the second sending arrangement is arranged on the Earth's surface, and
  wherein the second receiving arrangement is arranged on the satellite.

11. The satellite communication link according to claim 5, further comprising:
  a second sending arrangement; and
  a second receiving arrangement;
  wherein the second sending arrangement is arranged on the Earth's surface, and
  wherein the second receiving arrangement is arranged on the satellite.

12. The satellite communication link according to claim 5, wherein the first receiving arrangement is arranged onboard an aircraft.

13. The satellite communication link according to claim 12, further comprising:
  a second sending arrangement; and
  a second receiving arrangement;
  wherein the second sending arrangement is arranged onboard the aircraft, and
  wherein the second receiving arrangement is arranged on the satellite.

14. The satellite communication link according to claim 5, wherein the first receiving arrangement is arranged onboard a second satellite.

* * * * *